June 16, 1931. C. PARKER 1,810,724
CHAIN MAKING MACHINE
Filed Nov. 23, 1926 9 Sheets-Sheet 5
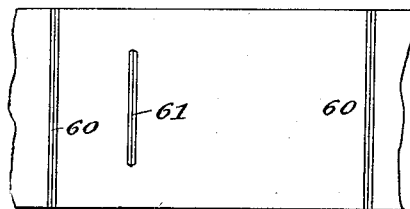
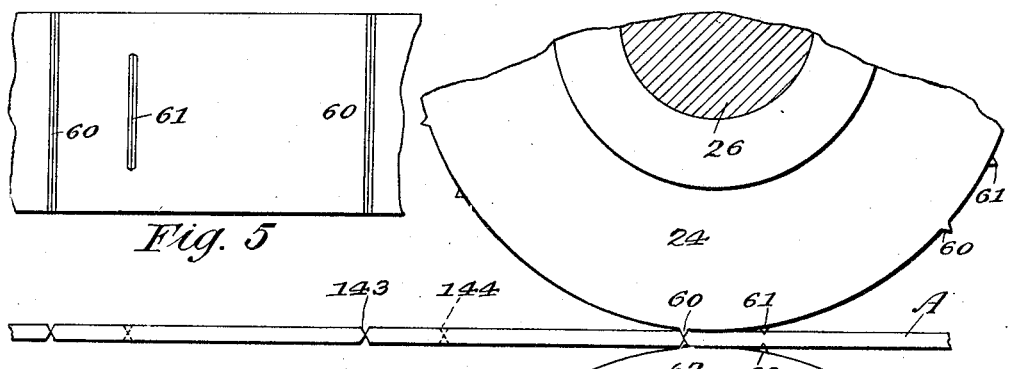
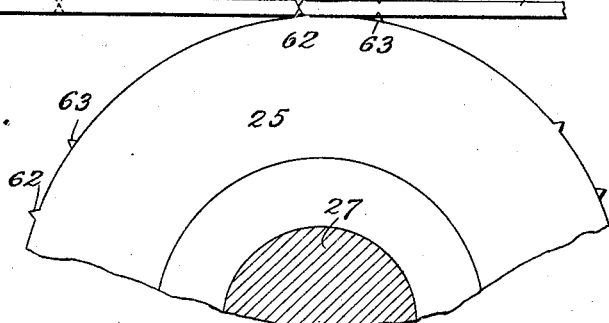
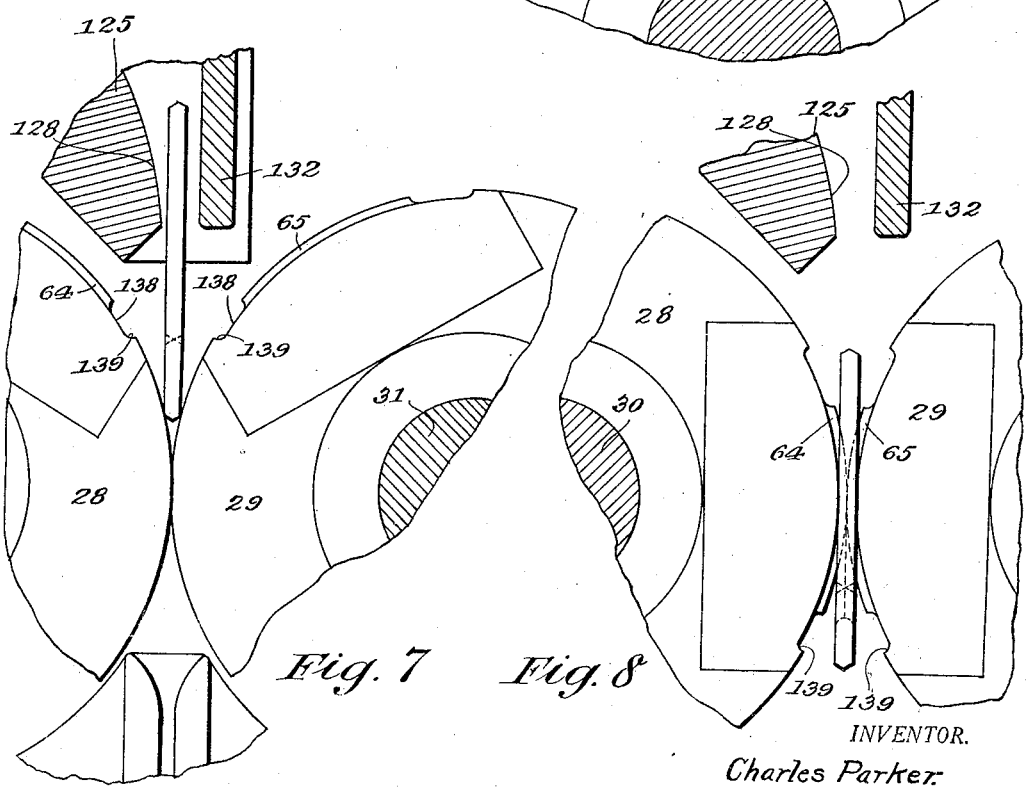
INVENTOR.
Charles Parker.
BY G. H. Braddock
ATTORNEY.

June 16, 1931. C. PARKER 1,810,724
CHAIN MAKING MACHINE
Filed Nov. 23, 1926   9 Sheets-Sheet 6

INVENTOR.
Charles Parker.
BY G. H. Braddock
ATTORNEY.

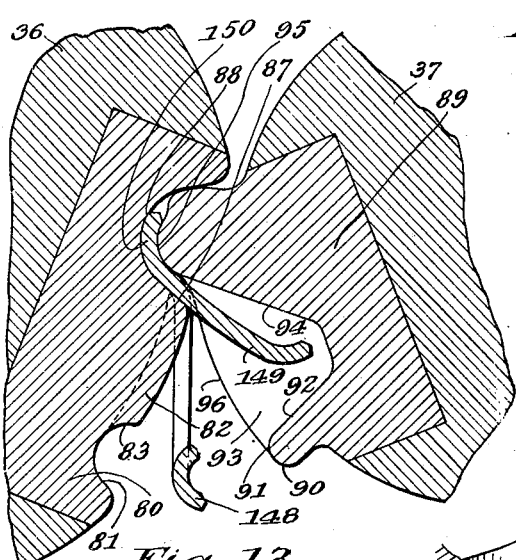
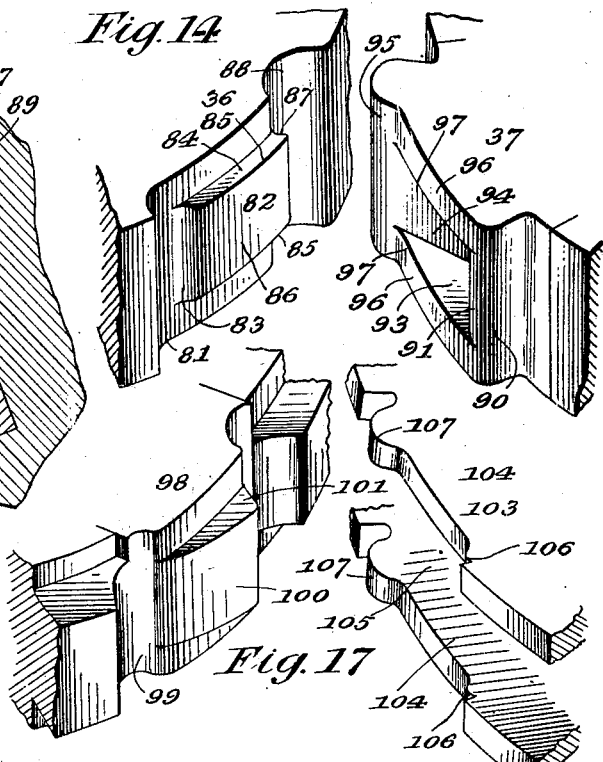
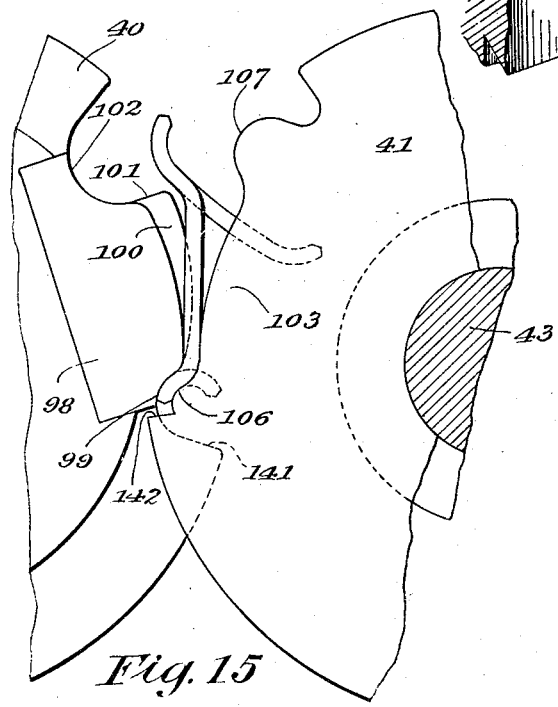
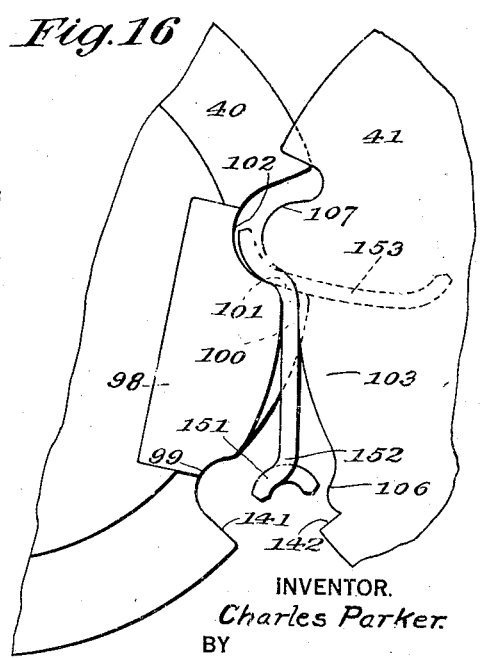

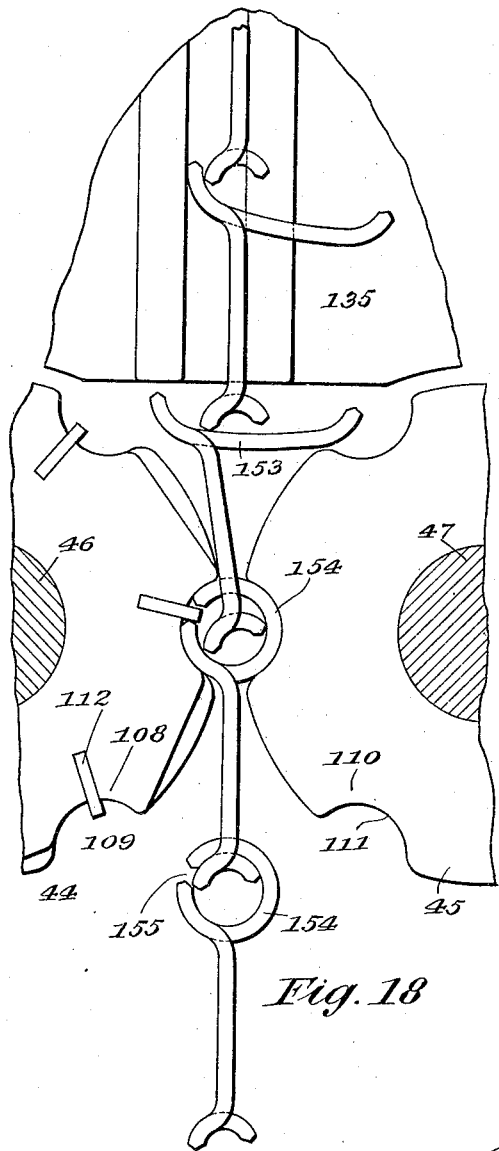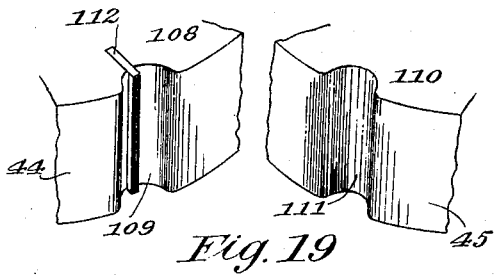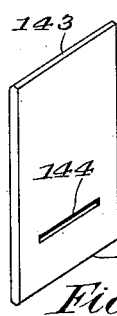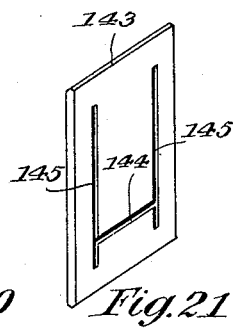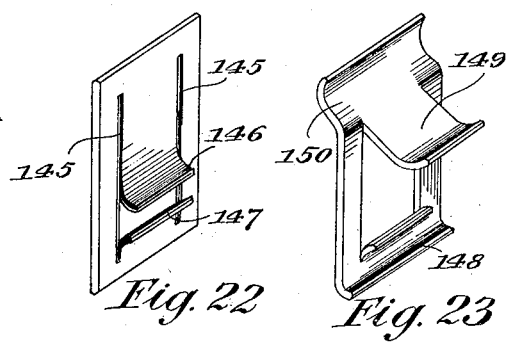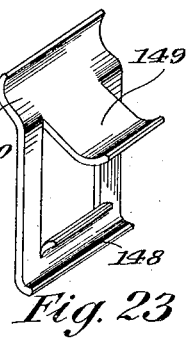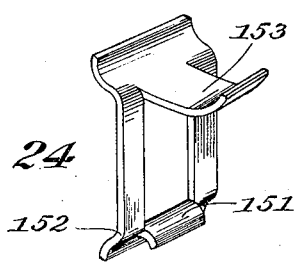

June 16, 1931.  C. PARKER  1,810,724
CHAIN MAKING MACHINE
Filed Nov. 23, 1926   9 Sheets-Sheet 9
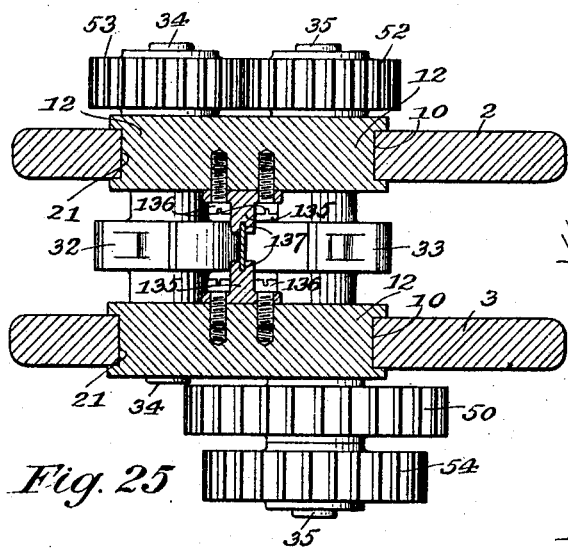
Fig. 25
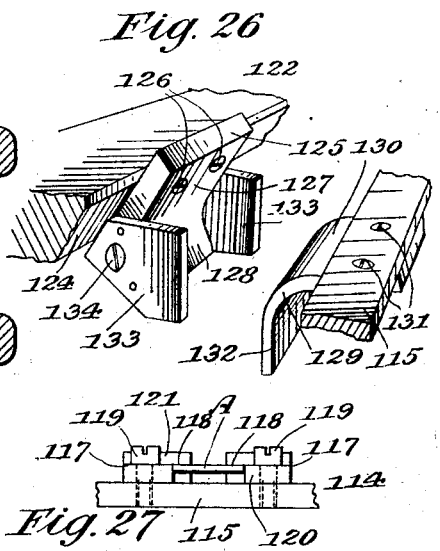
Fig. 26
Fig. 27
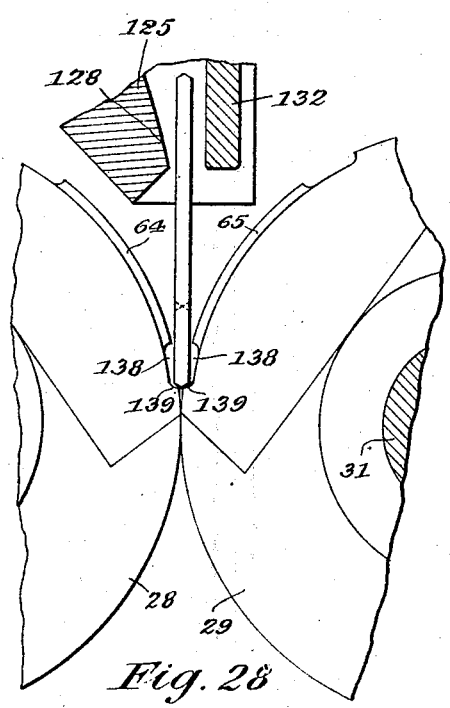
Fig. 28
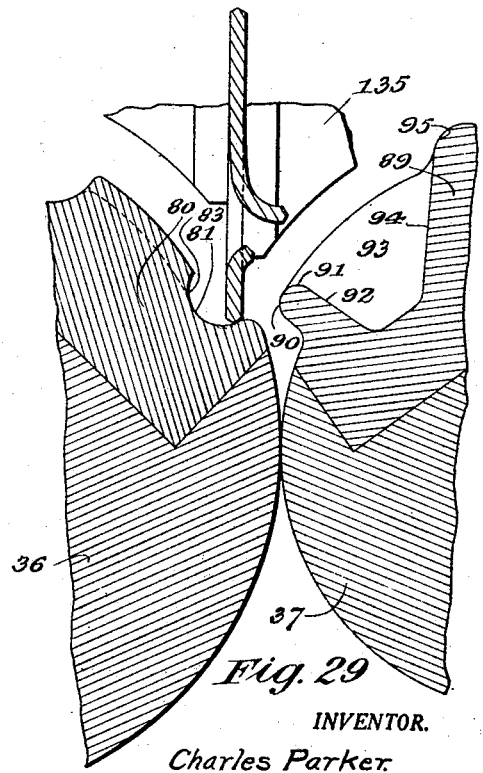
Fig. 29
INVENTOR.
Charles Parker.
BY
G. H. Braddock
ATTORNEY Patented June 16, 1931

1,810,724

UNITED STATES PATENT OFFICE

CHARLES PARKER, OF BRIDGEPORT, CONNECTICUT, ASSIGNOR TO THE LOCKE STEEL CHAIN COMPANY, OF BRIDGEPORT, CONNECTICUT, A CORPORATION OF CONNECTICUT

CHAIN MAKING MACHINE

Application filed November 23, 1926. Serial No. 150,312.

This invention relates to an apparatus for and a process of making chain links and assembling the same, and has more especial reference to an apparatus and a process for operating upon metal stock while the same is continuously fed to transform the stock into connected chain links.

The invention presents general and specific improvements over the disclosure of the pending application of Sylvanus D. Locke and Charles Parker, Serial No. 26,279, filed April 27, 1925. In that application an apparatus for and a process of successively transforming strip metal into connected chain links are disclosed, wherein the operations upon the strip of metal are performed concurrently with the feeding thereof, whereby production of chain can be more rapid than prior to the making of the Locke and Parker invention. The specific apparatus illustrated and described in the Locke and Parker application identified contemplates successive operations upon strip metal to provide nearly completed chain links integral with the strip, severance of the nearly completed chain links from the strip, and connection of each severed link to a continuously increasing strand of chain. While the said Locke and Parker apparatus is efficient in practice in the rapid production of chain links and chain, great care must be exercised to insure that there will be exact synchronization of the different sets of working elements which successively act upon the strip metal and its integral, partially completed links, and to insure that there will be exact registration with the working elements of the whole of the length of the strip metal and said integral, partially completed chain links.

An important object of the present invention is to provide an apparatus for and a process of successively transforming metal stock into connected chain links wherein the operations upon the stock are performed concurrently with the feeding thereof, and wherein each operation (or desired segregated series of operations) may be performed practically independently of all other operations (or segregated series of operations), whereby the accomplishment of the necessary synchronization of working elements with each other and the necessary registration of the stock with said working elements for the production of chain links and chain by the use of apparatuses and processes which contemplate operations upon stock concurrently with the feeding thereof may be greatly facilitated.

A further important object is to provide an apparatus for and a process of making chain links which contemplate the feeding of a strip of metal forwardly, the successive severance of individual blanks from the strip of metal, and the performance of successive transforming operations upon each blank to produce a chain link.

Another important object is to provide an apparatus for a process of making connected chain links which contemplate the continuous feeding of a strip of metal forwardly, the successive severance of blanks, one by one, from the strip, the performance of successive transforming operations upon each severed blank to produce a nearly completed chain link, and the successive connection of each nearly completed link to a continuously increasing strand of chain.

Another important object is to provide an apparatus for and a process of making chain wherein the working elements have forward motion with stock of which the chain is to be composed, as well as the motions necessary to transform the stock into connected chain links, and wherein each operation (or segregated series of operations) necessary to the production of chain may be performed upon the stock independently of all other operations (or segregated series of operations).

Another important object is to provide an apparatus for and a process of making chain wherein the different forming elements are carried by separate pressure producing elements to reduce the load on the pressure producing elements and greatly reduce their size, and wherein each operation (or segregated series of operations) necessary to the production of chain may be performed upon the stock independently of all other operations (or segregated series of operations).

Another important object is to provide an apparatus for and a process of making chain wherein the preliminary scoring, shearing and forming operations are performed by working elements which move uniformly and gradually toward and into the stock, and wherein each scoring, shearing and forming operation (or segregated series of operations) may be accomplished independently of all other scoring, shearing and forming operations (or segregated series of operations).

Another important object is to provide an apparatus for and a process of making chain wherein no feed mechanism other than the working elements or dies themselves is necessary, said elements and dies being capable of accounting for the feeding of the metal stock, including a metal strip and severed blanks, past the different working elements or dies, as well as for the feeding of the finished chain out of the machine, and the feeding of the severed blanks from one set of working elements or dies to the next being preferably accomplished by gravity.

Another important object is to provide an apparatus for and a process of making chain by performing successive transforming operations upon metal stock wherein the feeding of severed blanks from work station to work station is accomplished by gravity.

Another important object is to provide an apparatus for making chain by the performance of successive transforming operations upon metal stock wherein the feeding of severed blanks from work station to work station in the apparatus can be accomplished by gravity and wherein there will be exact registration between each severed blank and the working elements or dies at each station, whereby all of the operations upon each blank will be accurately performed.

Another important object is to provide novel mechanisms for insuring that the strip metal and the severed blanks will align with the working elements or dies of the machine.

Another important object is to provide an apparatus of the character hereinbefore stated, including mechanism for making chain links and assembling them, and also including mechanism for stretching said links when made up to a predetermined size.

Other important objects are to provide a novel construction of mechanism in the apparatus for successively severing, one by one, chain link blanks from a strip of metal; to provide novel working elements or dies for successively receiving and operating upon each blank whereby the blank is progressively transformed into a chain link; to provide a novel construction and arrangement whereby each set of oppositely disposed working elements or dies can be a part of a separate and distinct unit capable of being readily and easily assembled with or disassembled from the remainder of the apparatus; and to provide novel and improved mechanism for operating all of the movable parts of the apparatus.

Other objects and advantages will become apparent from the drawings and description of construction and operation of a machine embodying the invention herein selected for the purpose of illustration.

Fig. 5 is an enlarged fragmentary plan view detailing either working element or die of the first set of rolls;

Fig. 6 is an enlarged fragmentary elevational view detailing the first set of rolls, disclosing a strip of metal being operated upon;

Fig. 7 is an enlarged fragmentary elevational view detailing the second set of rolls, disclosing blank guides and a link blank in the upper guide resting upon the rolls;

Fig. 8 is a view corresponding with the showing of Fig. 7, but disclosing a link blank being operated upon by the second set of rolls;

Fig. 13 is a view corresponding with the showing of Figs. 11 and 12, but disclosing a link blank being finally operated upon by the fourth set of rolls;

Fig. 14 is an enlarged fragmentary perspective view of the rolls of Figs. 11, 12 and 13 (the fourth set of rolls);

Fig. 15 is an enlarged fragmentary elevational view detailing the fifth set of rolls, disclosing a link blank being initially operated upon;

Fig. 16 is a view corresponding with the showing of Fig. 15, but disclosing a link blank being finally operated upon by the fifth set of rolls;

Fig. 17 is an enlarged fragmentary perspective view of the rolls of Figs. 15 and 16 (the fifth set of rolls);

Fig. 18 is an enlarged fragmentary elevational view of the sixth or assembling set of rolls, disclosing a blank guide, link blanks in the guide, a link blank between the rolls and being operated upon, and connected chain links;

Fig. 19 is an enlarged fragmentary perspective view of the rolls of Fig. 18 (the sixth or assembling set of rolls);

Fig. 20 is a perspective view disclosing a blank of metal to provide a chain link as it appears when severed from the metal strip and before it has reached the second set of rolls;

Fig. 21 is a perspective view disclosing a blank as when between the second and third sets of rolls;

Fig. 22 is a perspective view disclosing a blank as when between the third and fourth sets of rolls;

Fig. 23 is a perspective view disclosing a blank as when between the fourth and fifth sets of rolls;

Fig. 24 is a perspective view disclosing a blank as when between the fifth and sixth (or assembling) sets of rolls;

Fig. 25 is a sectional view on line 25—25 in Fig. 4;

Fig. 26 is a perspective view detailing the mechanism for severing chain link blanks from a strip of metal;

Fig. 27 is an end view of the strip metal guide which cooperates with the link blank severing mechanism;

Figure 11:
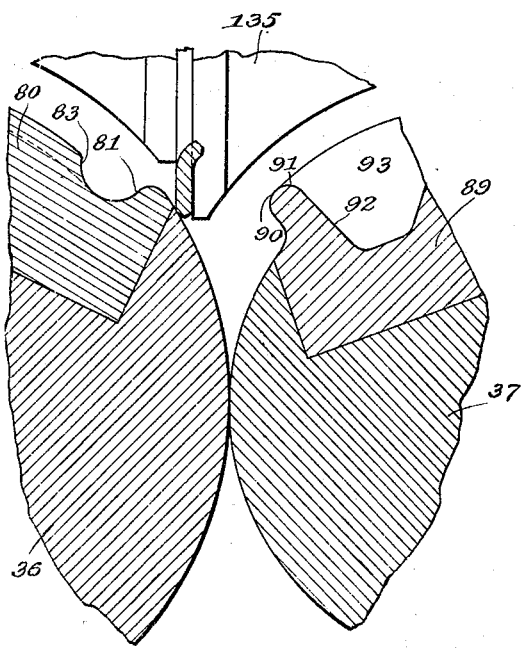
Fig. 11 is an enlarged fragmentary sectional view detailing the fourth set of rolls, disclosing a blank guide and a link blank therein resting upon a roll of said fourth set.
Figure 12:
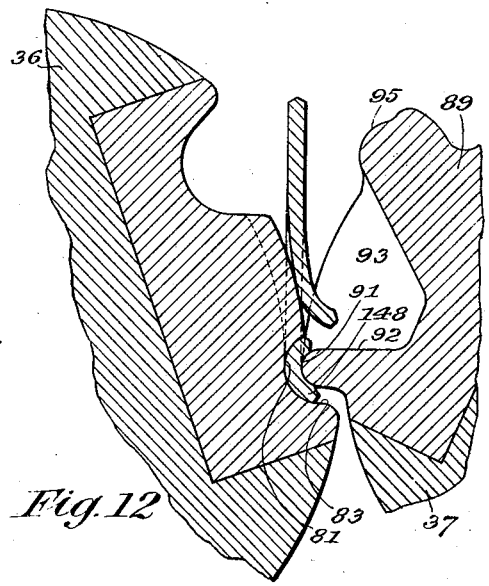
Fig. 12 is a view corresponding with the showing of Fig. 11, but disclosing a link blank being initially operated upon by the fourth set of rolls.

Fig. 28 is an enlarged fragmentary elevational view corresponding with the showing of Figs. 7 and 8, disclosing a manner in which the blanks may be made to advance with the rolls of the second (and third) set and to register with the working elements or dies thereof; and Fig. 29 is an enlarged fragmentary sectional view corresponding with the showing of Figs. 11, 12 and 13, disclosing a manner in which the blanks may be made to advance with the rolls of the fourth (and fifth) set and to register with the working elements or dies thereof.

In the drawings, 1 indicates the base of the machine, and 2, 3 indicate vertical, parallel spaced apart uprights, integral with the base. As shown, the base 1 and uprights 2, 3 are constituted by a casting, but the uprights could be provided in any other suitable manner.

The uprights support oppositely disposed, forwardly driven rolls, there being a set of oppositely disposed rolls for each operation, or segregated series of operations, required to produce chain.

As shown, there are six sets of oppositely disposed rolls or rotatable dies, one for each chain making operation (or segregated series of operations) to be performed in the machine, but it is to be understood that a greater or less number of sets can be utilized without departing from the spirit of the invention, and each set of oppositely disposed working elements or dies is a part of a separate and distinct unit capable of being readily and easily assembled with or disassembled from the uprights 2, 3.

As disclosed more clearly in Figs. 1, 2, 3, 4 and 25, the oppositely disposed rolls of a set are fixed upon parallel shafts rotatably mounted against longitudinal movement in parallel blocks, which are rectangular as disclosed, adapted to be associated with the uprights 2 and 3.

The uprights 2, 3 are recessed as indicated at 4 to receive the blocks, indicated 5, of the unit 6 having the first set of rolls or rotatable dies (to accomplish the first operation, or segregated series of operations, to produce chain), and said blocks 5 have a tongue and groove fit, as represented at 7, with the adjacent walls of the recess. Metallic strips 8 secured to the uprights 2 and 3 as indicated at 9 and engaging the outer faces of the blocks 5 insure the position of said unit 6 in said uprights.

The uprights 2, 3 are also recessed as indicated at 10 to receive the blocks, indicated 11, 12, 13, 14 and 15 of the units 16, 17, 18, 19 and 20, having the second, third, fourth, fifth and sixth sets of rolls or rotatable dies respectively, (to accomplish the corresponding operation, or segregated series of operations, to produce chain), and each block 11, 12, 13, 14 and 15 has a tongue and groove fit, as indicated at 21, with the adjacent walls of the recess. As illustrated, the blocks 15 of the unit 20 having the sixth or assembling set of rolls or rotatable dies rest upon the base of the slot 10, the blocks 14 of the unit 19 having the fifth set of rolls rest upon the blocks 15 of the unit 20, the blocks 13 of the unit 18 having the fourth set of rolls rest upon the blocks 14 of the unit 19, the blocks 12 of the unit 17 having the third set of rolls rest upon the blocks 13 of the unit 18, and the blocks 11 of the unit 16 having the second set of rolls rest upon the blocks 12 of the unit 17. All of the blocks 11 to 15 are in vertical alignment, and metallic strips 22 secured to the uprights 2 and 3, as indicated at 23 and engaging the outer faces of the blocks 11 insure the positions of the units 11 to 15 in said uprights.

The rotatable dies of unit 6 (having the oppositely disposed working elements of the first set of rolls) are essentially for the purpose of operating upon a strip of metal to define blanks thereof to be removed to provide chain links, and the rotatable dies of the units 11 to 15 are essentially for the purpose of operating upon the individual blanks after they are removed from the strip to transform them into links and to connect the links into a continuously increasing strand of chain. The dies of unit 6 are, therefore, preferably situated to operate upon a horizontally fed and guided strip of metal, and the dies of the units 11 to 15 are preferably situated one beneath the other, whereby the feeding of a blank from one set of rotatable dies to the next set can be accomplished by gravity. The rotatable dies of unit 11 for the second operation, or segregated series of operations, are situated directly beneath a blank severing contrivance to be described, and guides for the blanks direct them from work station to work station in the machine in such manner that each blank will align with the working elements of each set of rotatable dies to operate upon the blank. The rotatable dies themselves are constructed to insure that there will be proper registration between blanks and working elements, all as will be fully hereinafter set forth.

The rolls or rotatable dies 24 and 25 of unit 6, fixed upon shafts 26 and 27, respectively, for the first operation (or series of segregated operations) in the machine, as disclosed include scoring tools for transversely scoring the metal strip for its full width to define blanks to provide chain links, and also include scoring tools for transversely scoring the metal strip as its midwidth to define the free ends of the short, narrow lip of the small end bar or pintle and the long, narrow lip of the large end or sprocket bar of each link.

The rolls or rotatable dies 28 and 29 of unit 16, fixed upon shafts 30 and 31, respectively, for the second operation (or series of segregated operations), include scoring tools for longitudinally scoring each blank at locations marking the ends of said shorter transverse score to define the side and end bars thereof; that is to say, to complete the outline of each link of the chain to be produced. It will be apparent that all of the scoring operations to outline a link could be accomplished upon the second set of rotatable dies, and that the first set could merely include the scoring tools for defining the blank ends.

The rolls or rotatable dies 32 and 33 of unit 17, fixed upon shafts 34 and 35, respectively, for the third operation (or series of segregated operations), include in their structure the severing and forming tools for severing and crimping or forming the free end of the central portion or long lip of the link blank to be employed in forming the large end or sprocket bar of each link, and for severing and crimping or forming the central portion or narrow lip of the small end bar or pintle of said link.

The rolls or rotatable dies 36 and 37 of unit 18, fixed upon shafts 38 and 39, respectively, for the fourth operation (or series of segregated operations), include in their structure the severing and forming tools for severing the body of said central portion or long lip of the link blank, adjacent its severed and crimped or formed end, for throwing the short, wide lip of the large end or sprocket bar and the severed long, narrow lip thereof in opposite directions out of the plane of the link blank side bars and for simultaneously bending, forming, or shaping said short, wide lip of the large end or sprocket bar to final form; and the rotatable dies 36 and 37 also include the forming tools for bending, forming, or shaping the short, wire lip of the small end bar or pintle to final form, thus completing the forming operations upon said small end bar or pintle.

The rolls or rotatable dies 40 and 41 of unit 19, fixed upon shafts 42 and 43, respectively, for the fifth operation (or series of segregated operations), include in their structure the forming tools for throwing the short, wide lip of the large end or sprocket bar and the severed long, narrow lip thereof in opposite directions further away from the plane of the link blank side bars (to approximately perpendicular position with respect to said side bars) in order that the end hook will be in its final forming and assembling position, and the rotatable dies 40 and 41 also include the forming tools for operating upon the small end bar or pintle to finally position it at desired angle with respect to the side bars of said link, approximately perpendicular to said side bars as disclosed.

The rolls or rotatable dies 44 and 45 of units 20, fixed upon shafts 46 and 47, respectively, for the sixth operation (or series of segregated operations), include in their structure the final end hook shaping and link assembling tools.

Figure 1:
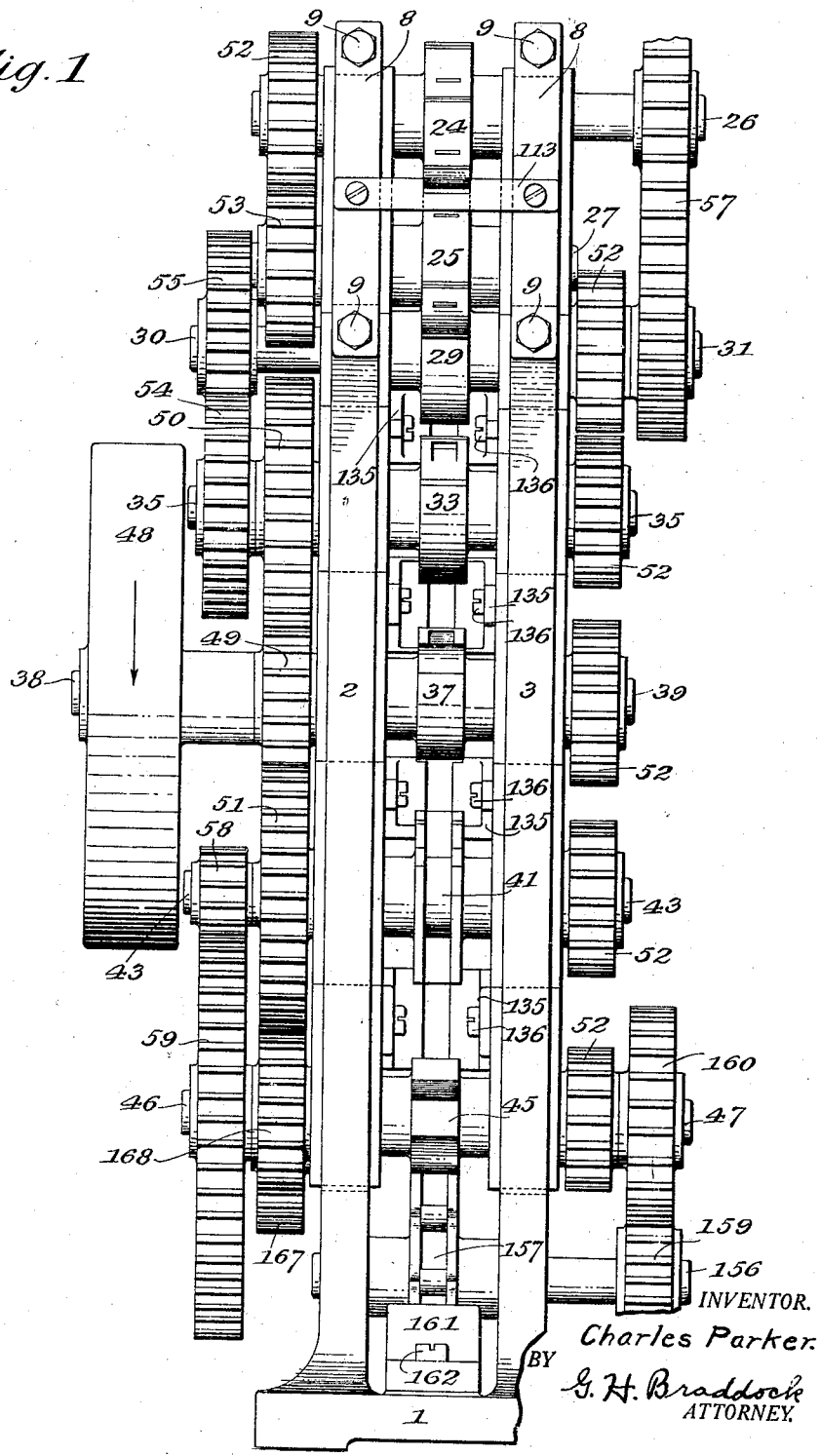
Figure 1 is a front elevational view of a machine illustrating one way of carrying out the invention, the improved apparatus being incorporated in the machine.
Figure 2:
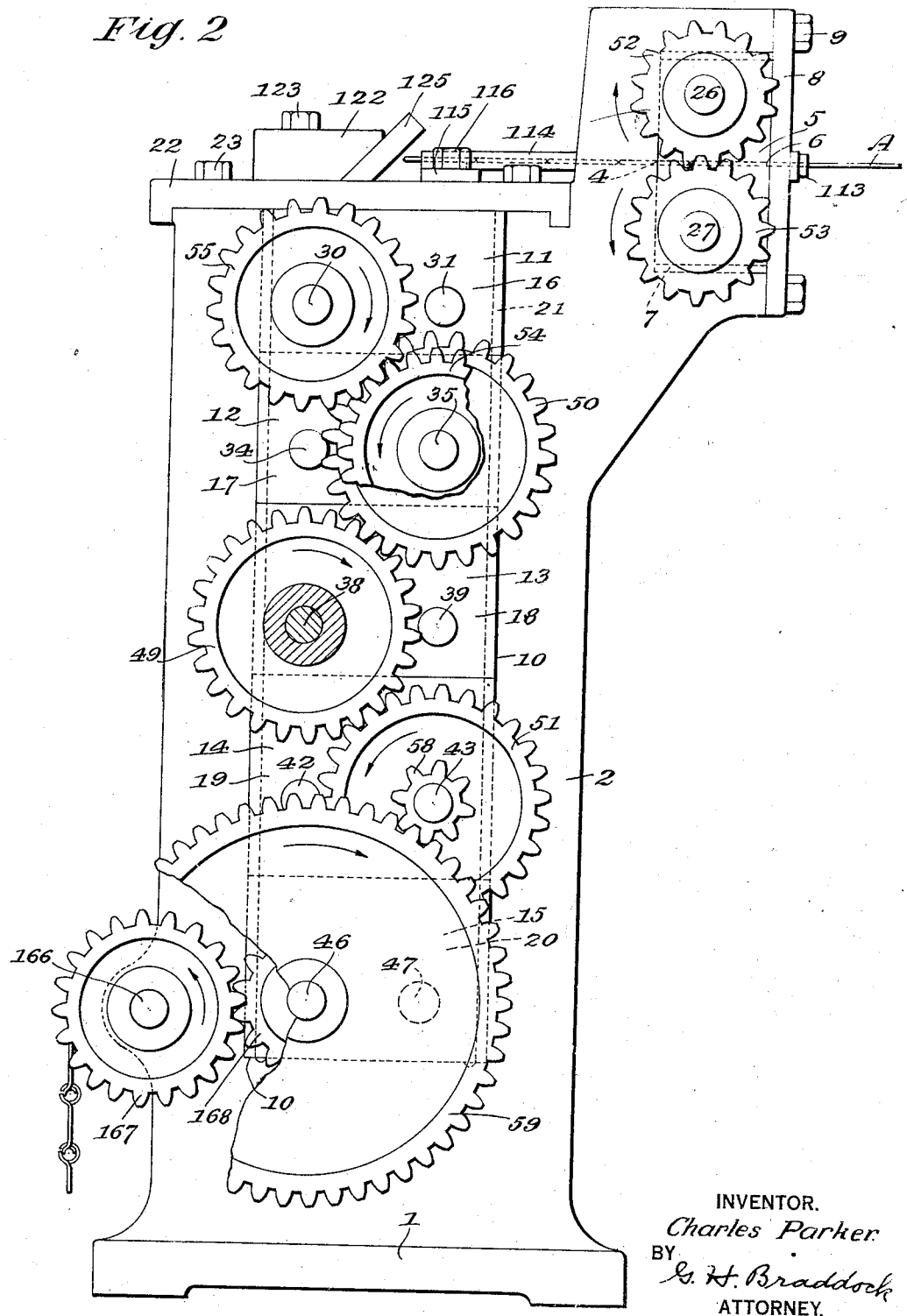
Fig. 2 is an elevational view of the machine looking at the drive side thereof.
Figure 3:
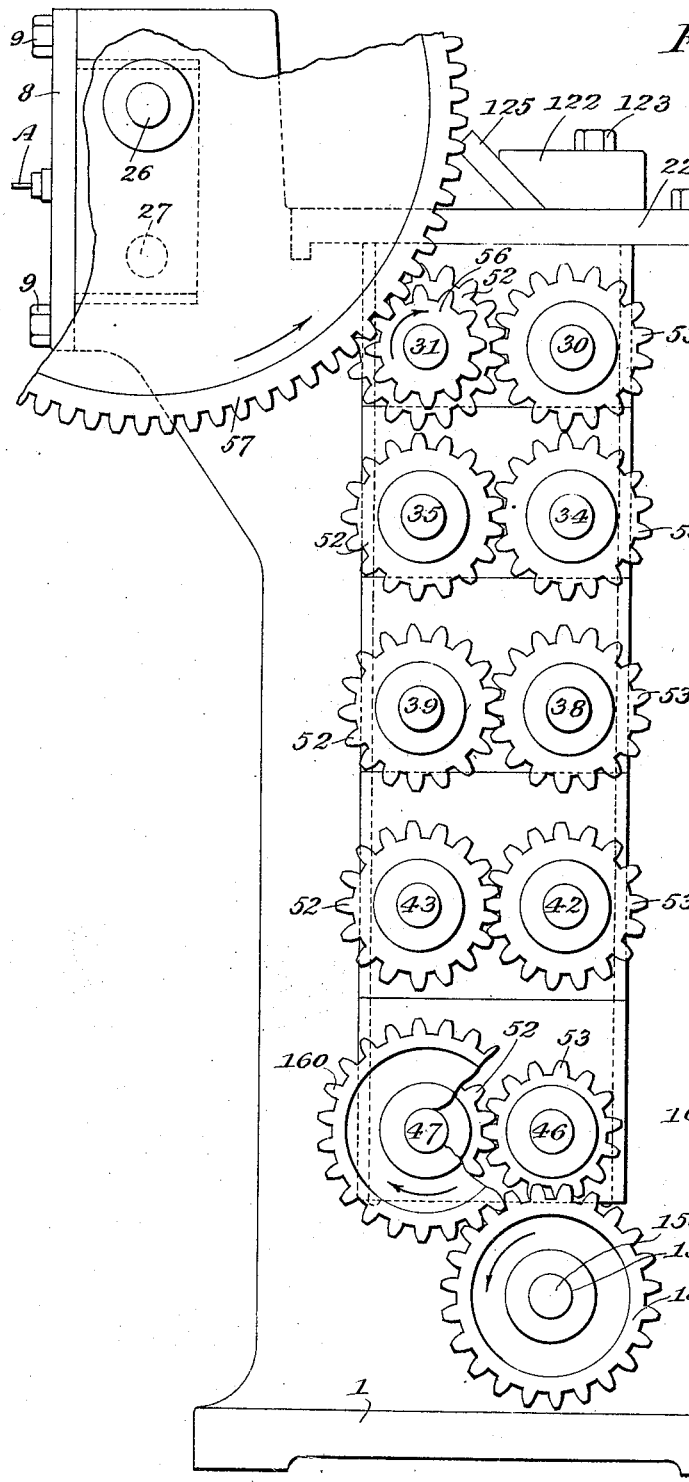
Fig. 3 is an elevational view of the machine looking at the side thereof opposite the drive side.

The rotatable dies may be driven forwardly in any manner, as by a belt pulley 48 fixed upon the shaft 38, the pulley rotating in the direction of the arrow as indicated in Fig. 1, to accomplish forward feeding of the fourth set of rolls. As shown, the rotation of the other oppositely disposed dies is accomplished and synchronized by means of a train of gears, there being a gear 49 fixed upon said shaft 38 and meshing with gears 50 and 51 upon shafts 35 and 43 to accomplish forward feeding of the third and fifth sets of rolls. A small gear 52 upon a shaft of each set of rotatable dies meshes with a similar gear 53 upon the other shaft of each set to insure the proper relative rotating arrangement of the dies of a set, and the remainder of the gear train for driving the oppositely disposed rotatable dies may be as follows: A gear 54 upon shaft 35 meshes with a gear 55 upon shaft 30 to accomplish forward feeding of the second set of rolls. A quite small gear 56 upon shaft 31 meshes with a quite large gear 57 upon shaft 26 to accomplish forward feeding of the first set of rolls. A still smaller gear 58 upon shaft 43 meshes with a gear 59 of intermediate size upon shaft 46 to accomplish forward feeding of the sixth or assembling set of rolls.

The rotatable dies can be fixed against longitudinal movement on their axes (between the uprights 2 and 3) in any suitable manner to insure that said dies will be in desired relation, and the rotatable dies can be locked against rotation upon their shafts in any convenient way.

Each rotatable die of the first and sixth sets contains a plurality of duplicate working elements, and each other rotatable die contains a single chain forming or working element. The tools of the elements of the opposite dies of each set of rolls are complements of each other. In the case of the first and sixth sets of rolls there are as many elements upon one die as there are upon the other and correspondingly arranged about the circumferences or peripheral margins of the dies to cooperate with each other in performing the particular work to be performed. In the case of the second, third, fourth and fifth sets of dies the elements are, naturally, similarly arranged to cooperate. The word "element" as herein used refers to a tool (or series of tools) of a die to cooperate with a duplicate or complemental tool (or series of tools) of an oppositely arranged die in performing a working operation in the machine.

As before mentioned, the first set of dies, to accomplish the first operation (or series of segregated operations) in the machine, may include the forming tools for transversely scoring a metal strip for its full width to define blanks to provide chain links, and for transversely scoring the metal strip at its midwidth to define, in the instance of each blank, the free ends of the short, narrow lip of the small end bar or pintle and the long, narrow lip of the large end or sprocket bar of each link to be produced.

60 are scoring knives of the duplicate elements arranged upon the die 24 of the first set of rolls adapted to impart lines of score to the upper surface of a strip of metal, which lines extend transversely of the strip for its full width and define blanks to provide chain links; that is to say, each scoring knife 60 imparts a transverse score to the strip of metal along the line of severance of two links which are to adjoin each other. 61 are scoring knives of the duplicate elements arranged upon said die 24 adapted to impart lines of score to the upper surface of the strip, which lines extend transversely of the strip and define, in the instance of each blank, the free ends of the short, narrow lip of the small end bar or pintle and the long narrow lip of the large end or sprocket bar of each link to be produced. 62 are scoring knives of the duplicate elements upon the die 25 corresponding with the scoring knives 60 and arranged to impart lines of score to the under face of the strip of metal, each of which lines is directly opposite a line of score imparted by one of the scoring knives 60. 63 are scoring knives of the duplicate elements upon the die 25 corresponding with the scoring knives 61 and arranged to impart lines of score to the under face of the strip of metal, each of which lines is directly opposite a line of score imparted by one of the scoring knives 61.

The second set of dies, to accomplish the second operation (or series of segregated operations), may include the scoring tools for longitudinally scoring each blank to define the side and end bars thereof.

64 are scoring knives of the element arranged upon the die 28 of the second set of rolls adapted to impart lines of score to a face of each link blank, which lines are parallel in the direction of feed of the blank and are at locations marking the ends of the shorter transverse score lines imparted by the scoring knives 61, 63 of the first set of rolls. 65 are scoring knives of the element arranged upon the die 29 of said second set of rolls arranged to impart lines of score to the opposite face of each link blank, each of which lines is directly opposite a line of score imparted by one of the scoring knives 64.

The third set of dies, to accomplish the third operation (or series of segregated operations), may include the working tools for severing and crimping or forming the free end of the central portion or long lip of the link blank to be employed in forming the large end or sprocket bar of each link, and for severing and crimping or forming the central portion or narrow lip of the small end bar or pintle of said link.

Figure 9:
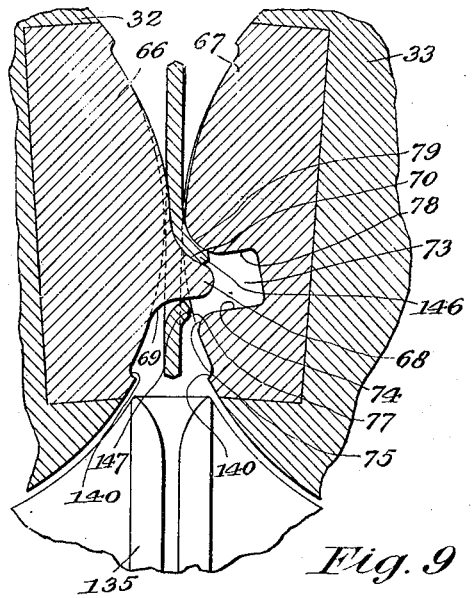
Fig. 9 is an enlarged fragmentary sectional view detailing the third set of rolls, disclosing a link blank being operated upon.

66 represents the severing, crimping and forming element of the die 32 of the third set of rolls, and 67 represents the complemental severing, crimping and forming element of the die 33 of said third set. The elements 66 and 67 are essentially for the purposes of breaking through the metal on the lines of score made by the knives 61, 63, and 64, 65, of crimping or forming the free end of the long narrow lip of the sprocket bar, and of crimping or forming the narrow lip of the small end bar or pintle adjacent the lines of score made by the knives 61, 63. As shown, the element 66 includes a severing and crimping punch 68 having a forward, concave substantially quarter-circle crimping surface 69 merging in the circumference of the die 32; a rearward, concave, substantially quarter-circle crimping surface 70, also merging in the circumference of the die 32; and parallel side faces 71, perpendicular to the axis of the die 32, defining spaced apart, parallel severing edges 72 perpendicular to the crimping surfaces 69 and 70. The element 67 is constituted by a depression 73 in the peripheral face of the die 33 to receive the severing and crimping punch 68. The forward portion of the depression is defined by an approximately radial face 74 providing a transverse, convex, substantially quarter-circle crimping surface 75 to cooperate with the crimping surface 69 in crimping or bending, shaping, or forming the central portion or narrow lip of the short end bar or pintle of a link as it is severed along the lines of score by the punch 68. To the rear of the radial face 74 and convex crimping surface 75 the depression 73 has parallel side walls 76, perpendicular to the axis of the die 33, defining spaced apart severing edges 77 perpendicular to the convex crimping surface 75. The rearward portion of the depression 73 is defined by an approximately radial face 78 merging in a transverse, substantial quarter-circle 79, itself merging in the circumference of the die 33. The quarter-circle 79 is a convex crimping surface to cooperate with the crimping surface 70 in crimping or forming the forward or free end of the central portion or long, narrow lip of the sprocket or large end bar of a link. The action of the severing edges 72 and 77 is to sever the metal of a link blank along the lines of score made by the scoring knives 64, 65, adjacent the lines made by the scoring knives 61, 63, and the action of the severing and crimping punch is to simultaneously sever the metal of said blank along the lines of score made by said scoring knives 61, 63, whereby the complemental crimping surfaces at the front and rear of elements 66 and 67 can operate in the manner described. The action of said crimping surfaces as illustrated is to throw the severed free end of the central portion or long lip and the narrow lip of the small end bar of the link out of the plane of the link side bars and to give to both said free end and said narrow lip a substantially quarter-circle crimp. The peripheral faces of the dies 32 and 33 engage the bars of each link blank while the severing, crimping and forming elements of said dies 32 and 33 perform their function. See Fig. 9.

The fourth set of dies, to accomplish the fourth operation (or series of segregated operations), may include the working tools for severing the body of the central portion or long lip of the link blank adjacent its severed and crimped or formed end, for throwing the short, wide lip of the large end or sprocket bar and the severed long, narrow lip thereof in opposite directions out of the plane of the link blank side bars, and for simultaneously bending, forming, or shaping said short, wide lip of the large end or sprocket bar to final form, and the fourth set of dies may also include the working tools for bending, forming, or shaping the short, wide lip of the small end bar or pintle to final form, to finish the forming operations upon said small end bar or pintle.

The element 80 of the die 36 of the fourth set of rolls includes a forward transverse, concave, part-circle crimping surface 81 which extends the full width of the die. Directly to the rear of said part-circle surface 81 is a shearing and bending projection 82 having a transverse, concave forward substantially quarter-circle surface 83 of less width than the die and arranged centrally thereof, said quarter-circle surface 83 being contiguous with the part-circle surface 81. To the rear of the quarter-circle surface 83 the shearing and bending projection has parallel side faces 84, perpendicular to the surface 83, defining circumferentially extending cutting edges 85 for shearing the metal of a blank along the lines of score made by the scoring knives 64, 65 to define the body of the central portion or long, narrow lip of the large end or sprocket bar, the free or outer end of said long lip having already been severed and crimped in the third set of rolls. The outer face 86 of the shearing and bending projection 82 extends circumferentially of the die 36 and terminates at its rear end in a transverse, smooth, short, curved shaping or bending face 87 itself terminating in a rearward transverse, concave, part-circle crimping surface 88 extending the full width of said die 36. The element 89 of the die 37 of the fourth set of rolls includes a forward, transverse, convex, substantial quarter-circle crimping surface 90 extending the full width of said die 37, complemental to the part-cycle surface 81. The quarter-circle crimping surface 90 merges in a transverse, convex substantially quarter-circle surface 91, complemental to the quarter-circle surface 83, defined by an approximately radial wall 92 of a depression 93 to the rear of said quarter-circle surface 91. At the rear of the depression 93 is an oblique wall 94 providing a transverse, convex, part-circle crimping surface 95, complemental to the part-circle surface 88 and the short, curved shaping or bending face 87. The depression 93 defines approximately arc shaped flanges 96 spaced apart a distance approximately equal to the width of the long, narrow lip and the short, narrow lip of the end bars of a link. The peripheral surfaces of these flanges are constructed to engage the side bars of a link blank as the same passes between the rolls of the fourth set, to cooperate with the perimeter or circumference of the die 36 in insuring forward, preferably vertical feeding of the link blanks during the working operations in the fourth set of rolls. See Figs. 11 to 14. The inner edges 97 of the flanges 96 provide cutting edges complemental to the cutting edges 85 of the die 36. The complemental part-circle surfaces 81 and 90 directly engage the wide lip of the small end bar to give it a quarter-circle crimp. The complemental quarter-circle surfaces 83 and 91 engage opposite faces of the short, narrow lip of the small end bar or pintle to together insure that said short, narrow lip will not lose its quarter-circle shape during the shaping, bending, or forming operation upon said short, wide lip of the small end bar or pintle by said complemental part-circle surfaces 81 and 90. As will be clear from Figs. 12 and 23, the action of the part-circle surfaces 81 and 90 is to throw the short, wide lip of said small end bar or pintle in the same direction out of the plane of the link side bars as is the previously crimped short, narrow lip, and thus shape the small end bar or pintle to final, preferably half-circle, form. The combined action of the cutting edges 85 and 97 is to sever the metal of the stock along the lines of score made by the scoring knives 64, 65 to define the body of the long, narrow lip of the sprocket bar adjacent the forward or free end thereof, already severed and crimped or formed by the third set of rolls. The combined action of the complemental part-circles 88 and 95, and of the short, curved shaping surface 87 and the projection 82, which surface and projection cooperate with the part-circle surface 95, is to throw the short, wide lip of the sprocket bar and the severed long lip thereof in opposite directions out of the plane of the link blank side bars, and to simultaneously shape said short, wide lip to final, preferably quarter-circle, form. As disclosed, in Figs. 13 and 23, the elements 80 and 89 are constructed to throw the severed long lip of the sprocket or large end bar to position it at the same side of the blank as are the narrow and wide lips of the small end bar or pintle when past the fourth set of rolls, and to throw the short, wide lip of the said sprocket bar to the opposite side of the blank side bars. The long, narrow lip of the sprocket bar moves in a circle into the space or depression 93 between the flanges 96, the curved surface 87 insuring desired circular movement of said long, narrow lip. The part-circles 88 and 95 directly engage the opposite faces of the short, wide lip of the sprocket bar to throw said short, wide lip out of the plane of the link side bars and give it a quarter-circle curve.

The fifth set of dies, to accomplish the fifth operation (or series of segregated operations), may include the working tools for throwing the short, wide lip of the large end or sprocket bar and the severed, long narrow lip thereof in opposite directions further away from the plane of the link blank side bars, to about perpendicular position with respect to said side bars, in order that the end hook will be in its final forming and assembling position, and the fifth set of dies may include the working tools for operating upon the small end bar or pintle to finally position it at desired angle with respect to the side bars of said link, preferably approximately perpendicular to said side bars.

The element 98 of the die 40 of the fifth set of rolls includes a forward transverse, concave, part-circle bending surface 99 which extends the full width of the die. Directly to the rear of said part-circle surface 99 is a projection 100 having a rearward transverse, approximately radial bending face 101 of less width than the die and arranged centrally thereof. The radial bending face 101 terminates in a rearward transverse, concave part-circle bending surface 102 also extending the full width of the die 40. The element 103 of the die 41 of the fifth set of rolls includes spaced apart flanges 104, providing a space 105 between the flanges of approximately the width of the long, narrow lip of the large end or sprocket bar and the short, narrow lip of the small end bar or pintle of the link. The peripheral surfaces of these flanges are constructed to engage the side bars of a link blank as the same passes between the rolls of the fifth set, to cooperate with the die 40 in insuring forward, preferably vertical feeding of the link. The peripheral surfaces of the flanges 104 include forward, oppositely disposed, convex bending surfaces 106 complemental to the bending surface 99, and rearward, oppositely disposed, convex bending surfaces 107 complemental to the bending surface 102 and radial bending face 101. The combined action of the bending surfaces 99 and 106 is to place the small end bar or pintle in its final position, at proper angle to the link side bars, perpendicular as disclosed. The bending surface 99 directly engages the full width of one face of the already formed short, wide lip of the small end bar or pintle, the bending surfaces 106 directly engage the outer margins of the other face of said formed short, wide lip of said small end bar or pintle, and said mentioned surfaces together cause said short, wide lip to be bent in the direction toward the axis of the die 40, thus making the short, narrow lip of the small end bar or pintle move toward the axis of the die 41 into the space 105 between the flanges 104. Clearly, the shape of the bending surfaces 99 and 106 and their relations to the axes of the sides 40 and 41, respectively, determine the position which the small end bar or pintle finally bears to the link side bars. The arrangement (to be described) for causing the blanks to advance with the rolls of the fifth set is adapted to insure that there will be that registration of each blank with the bending surfaces 99 and 106 to procure the bending or forming result more clearly disclosed in Figs. 15 and 16. The combined action of the bending surfaces 102 and 107 and the radial face 101 which cooperates with the bending surfaces 107, is to throw the short, wide lip of the large end or sprocket bar further away from the plane of the link blank side bars and thus throw the long, narrow lip of said large end or sprocket bar further into the space between the flanges 104, to position the end hook approximately at right-angles to the link side bars. See Figs. 16 and 24. The part-circle surfaces 102 and 107 directly engage the opposite faces of the short, wide lip of the sprocket bar to throw said short, wide lip further out of the plane of the link side bars, and the inner or connected end of the narrow lip of said sprocket bar is directly engaged by said radial face 101. See Fig. 16.

The assembling elements may be on the last set of rolls. The die 44 of the last set has elements 108 each of which includes a part-circle surface 109 preferably slightly less than a half-circle, and the die 45 of this set has similar, complemental elements 110 each including a part-circle surface 111. The elements 108 each include a spacing mandrel 112 arranged transversely of the die to define a quarter-circle arc at the forward portion of the part-circle surface 109, the spacing mandrel being for the purpose of providing the detaching slot present in the finished chain and for locating the short, wide lip of the large end or sprocket bar of the link in said part-circle surface 109. Obviously, the part-circle surfaces 109 and 111 are complemental, their combined action serving to roll the long lip or end hook to circular form.

Mechanism is provided for guiding a fed strip of metal to and past the first set of rolls and to the link blank severing mechanism, a strip metal guide being adapted to cooperate with said blank severing mechanism.

113 is a slotted horizontal strip metal guide secured upon the metallic strips 8 in any convenient manner at the elevation of the work station of the first set of rolls and adapted to direct the strip metal to the rolls of said first set.

114 denotes, generally, a different form of guide device for directing the strip metal from the first set of rolls to the link blank severing mechanism. Of the present guide device, 115 is a horizontal support secured upon the metallic strips 22 as indicated at 116, and 117 denotes parallel and spaced apart guides or gages adapted to lie in the horizontal plane of the line of feed of the strip of metal and having longitudinal grooves 118 in their adjacent side edges adapted to receive the side edges of said strip of metal. The guides or gages 117 may be secured to the support 115 in any manner, as indicated at 119 in Fig. 27. The forward end of the portion of each guide or gage 117 above its groove 118 terminates close to the blank severing mechanism, as represented at 120 in Fig. 4, while the forward end of the portion of each of said guides or gages 117 below its groove terminates a further distance away from said severing mechanism, as indicated at 121.

Of the link blank severing mechanism, 122 is a breaker support secured upon the metallic strips 22 as indicated at 123 and having a forward, oblique face 124 against which is secured a breaker 125 as indicated at 126. The upper portion 127 of the forward face of the breaker is oblique, and said upper portion merges on a smooth curve into a preferably vertical portion 128. The breaker is situated at right-angles to the line of feed of the strip of metal.

The link blank severing mechanism includes guide means for properly directing severed link blanks to the second set of rolls, the blanks being adapted to be fed by gravity from the severing mechanism to said second set. 129 is a curved guide plate having a horizontal portion 130 secured to the under face of the support 115 as at 131 and a vertical portion 132 closely adjacent to and parallel with the vertical portion 128 of the forward face of the breaker 125. The remainder of the guide means consists of side gages 133 secured to the side edges of the lower portion of the breaker as at 134 and extending beyond the side edges of the curved guide plate 129.

Evidently, as the strip of metal is fed against the breaker 125, individual links are separately removed therefrom. The lower portions of the guides or gages 117 terminate adjacent the location where the rear end of each link blank, as defined by the score lines made by the scoring knives 60, 62 (see Fig. 4), is situated when the front end thereof strikes said plate, while the upper portions of said guides or gages 117 extend further forwardly, the guide device 114 thus cooperating with the breaker to assure that a single link blank will be removed at a time, as will be apparent. The guide means of the blank severing mechanism is in close proximity to the rolls of the second set, and before a link has completely left said guide means it has entered the rolls of said second set. See Fig. 4.

Similarly, additional guide devices are provided for directing the blanks from the second to the third to the fourth to the fifth and to the sixth sets of rolls, said blanks moving by gravity from roll to roll. An enlarged sectional view of the guide device between the second and third sets of rolls is disclosed in Fig. 25. 135 represents guides or gages secured to the blocks 11 as indicated at 136 and having oppositely disposed, vertical slots 137 adapted to receive the opposite side edges of each blank. Before a blank has left the second set of rolls it has partially entered the guide device between the second and third sets, and before the blank has left said guide device between said second and third sets it has entered between the rolls of said third set.

The guide devices between the third and fourth, the fourth and fifth, and the fifth and sixth sets may be similar to the guide device of Fig. 25, but the slots 137 will be wider in the case of the guides between the fourth and fifth and the fifth and sixth sets of rolls to allow passage of the shaped or partially shaped wide lips of the end bars of the link blanks. In the case of the guide devices between the third and fourth, the fourth and fifth, and the fifth and sixth sets of rolls, the guides or gages are preferably spaced apart a distance greater than the width of the narrow lips of the end bars; that is to say, the vertical slots 137 desirably each receive a width of metal not greater than a link blank side bar, while the long, narrow lip of the partially shaped large end or sprocket bar extends to one side of the guides or gages of the guide device. See Fig. 4.

As in the case of the guide device of Fig. 25, between the second and third sets of rolls, each blank from the third set of rolls partially enters the guide device below said third set before leaving said third set, enters the fourth set of rolls before leaving the mentioned guide above the fourth set, and so on. As disclosed in Fig. 4, several blanks are at all times in the guide device between the fifth and sixth or assembling sets of rolls, while but a single blank is at any time in the guide device of the blank severing mechanism and in the other guide devices between the second to the fifth sets. As will be clear, the guide devices of the third to the sixth sets are parts of the units of the separate sets of rolls and can be assembled with the units before said units are assembled with the uprights 2, 3; that is to say, each of the units 17, 18, 19, and 20 includes a guide device consisting of guides or gages 135 secured to the units as at 136.

All of the guide devices described are, of course, arranged to cause the strip of metal and the severed link blanks to align with the different working tools in the machine.

The feeding of the strip of metal to the link blank severing mechanism is accomplished either by the rolls of the first set of rolls, or by feeding devices (not shown) auxiliary to the rolls of said first set. The feeding of the link blanks past the rolls of the second through the sixth sets is accomplished by the rolls themselves. The gravity feed of the link blanks from the guide device of the link blank severing mechanism to the second set of rolls, from the second set to the third set, from the third to the fourth, from the fourth to the fifth, and from the fifth to the sixth set makes necessary the provision of an arrangement for insuring that the blanks will advance with the rolls in such manner that there will be exact registration between the working elements of the different sets and the blanks. The rotatable dies themselves are constructed to control the feed of the blanks to the working elements and thus insure proper registration.

The manner in which a blank enters the second set of rolls will be most clear from Figs. 7 and 28. In Fig. 7 the peripheries of the dies 28 and 29 are in engagement and the blank is resting upon both dies. Obviously, it cannot advance until the cut-in portions 138 of the different dies register to provide clearance space for the blank to advance. At this time the forward end of the blank will rest upon the forward parts 139 of the cut-in portions as disclosed in Fig. 28 and will advance with the rolls. Clearly, special devices (not shown) could be employed to arrest the blanks and allow them to be in synchronism with the rolls to accomplish registration.

Figure 10:
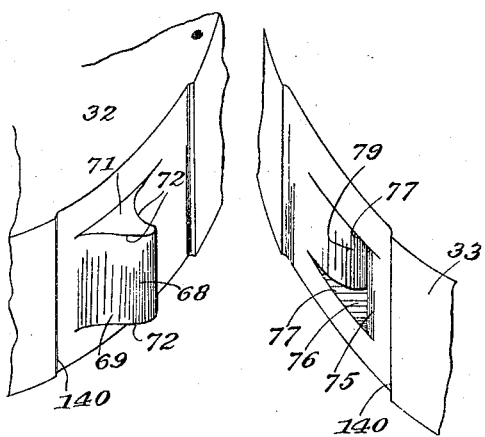
Fig. 10 is an enlarged fragmentary perspective view of the rolls of Fig. 9 (the third set of rolls)

The blanks may enter the third set of rolls in the manner as just described. See Fig. 4 wherein a blank is resting upon the peripheries of the dies 32 and 33, and Figs. 9 and 10 having cut-in portions 140 similar to the cut-in portions 138.

The blanks may enter the fourth set of rolls in the manner best disclosed in Figs. 11 and 29. In Fig. 11 a blank is resting upon the periphery of the die 36. In Fig. 29 the part-circle surface 81 has passed beneath the blank, and evidently, as the rotatable dies of the fourth set advance further, the blank feeds ahead, first reaching the position as in Fig. 12 and then the position as in Fig. 13.

Figure 4:
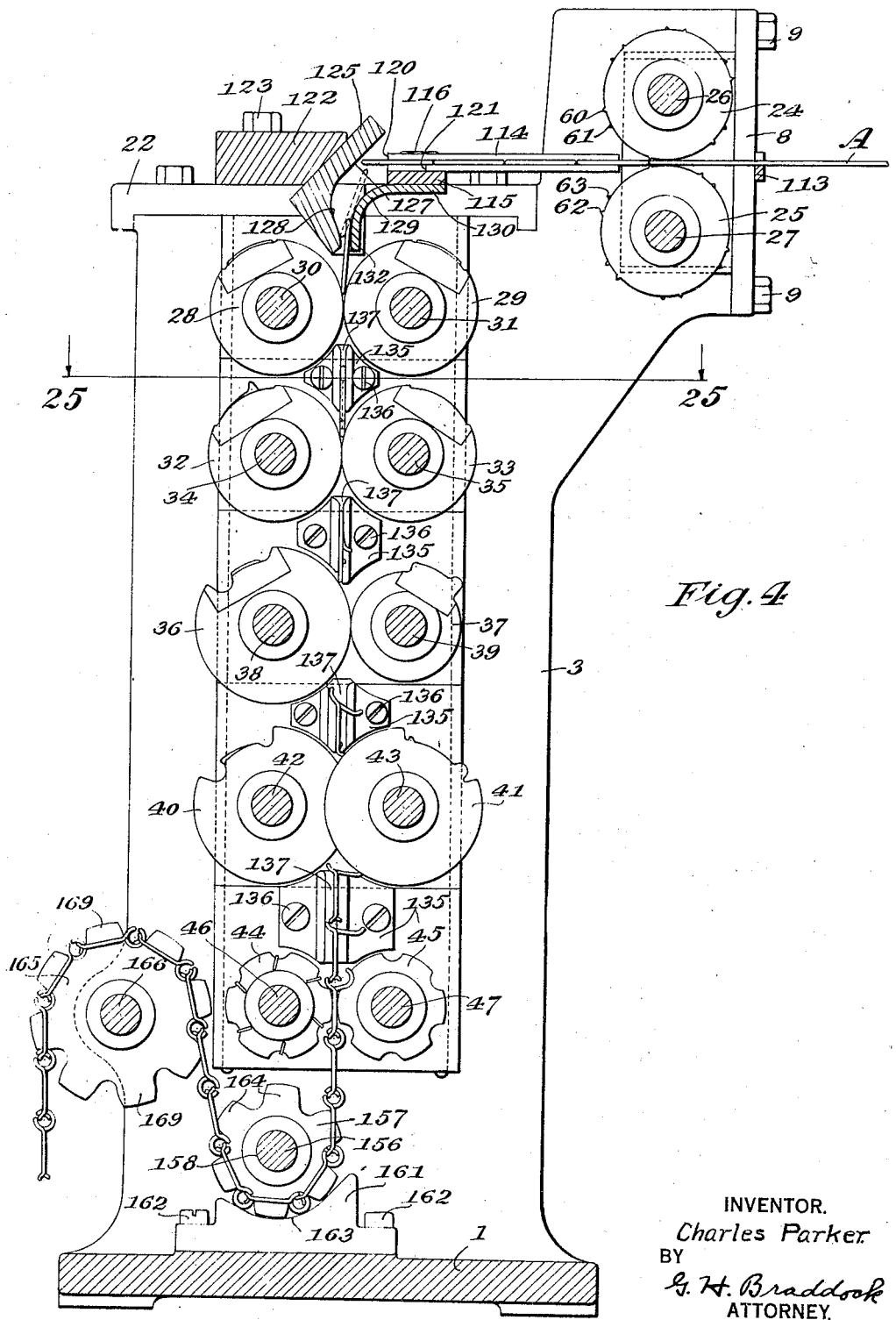
Fig. 4 is an irregular, vertical sectional view of the machine, disclosing stock therein.

The blanks may enter the fifth set of rolls in the manner best disclosed in Figs. 4 and 15. In Fig. 4 a blank is resting upon the periphery of the die 40. The dies 40 and 41 have approximately radial, overlapping shoulders, denoted 141 and 142, respectively, at the forward ends of the elements 98 and 103, just in advance of the part-circle surfaces 99 and 106, the outer ends of said shoulders terminating in the peripheries of the dies. As the dies 40 and 41 advance from their positions of Fig. 4 toward their positions of Fig. 15, the radial shoulders 141 and 142 ride beneath the blank and allow it to advance with the dies. The construction is such that at the proper instant after the advancement of the blank, action is commenced upon it by the part-circle surfaces 99 and 106 to accomplish the bending result desired upon the small end bar or pintle. Obviously, the bending result obtained will depend upon the relation of the radial shoulders 141 and 142 to the part-circle surfaces 99 and 106 and the location (elevation) above the horizontal axes of the dies 40 and 41 that said part-circle surfaces commence their operation.

The succession of link blanks from the fifth set of rolls through the guide device between the fifth and sixth or assembling sets and through said sixth or assembling set of rolls cares for the necessary registration between the blanks and the assembling elements of said sixth set; that is to say, there is at all times a link blank being operated upon in the assembling rolls and engaged by the forward end of a succeeding link blank from the rolls of the fifth set.

The operation of the machine thus far described will be readily understood. A strip of metal A is guided between the first set of rolls and power is applied to rotate all of the rolls, the strip being fed forwardly, preferably continuously, by the first set of rolls or by auxiliary feeding devices (not shown). The strip and the blanks are guided and centered by all of the guides or gages so as to lie properly between all of the sets of rolls. A section of metal of the strip which is to form a link blank is first acted upon by the scoring knives 60, 62 and 61, 63 to score the upper and lower surfaces of the stock along the lines 143 and 144, respectively, to thus define a chain link blank and the free ends of the narrow lips thereof. Thence the section outlined for the blank passes beyond the first set of rolls and the succeeding scoring knives of the first set move forwardly and vertically, uniformly and gradually, into the forwardly moving stock to repeat the operation just described.

The defined sections pass on toward the link blank severing mechanism, and as a section strikes the breaker 125 it is severed from the strip at the score line 143 and drops through the guide device of the blank severing mechanism, in the manner illustrated in Fig. 4 and already fully described, to the second set of rolls to rest upon the peripheries of the dies thereof. Eventually, succeeding link blanks pass one by one to the blank severing mechanism and between each set of rolls, passing from set to set and through the sets in the manner hereinbefore fully stated. The dies of all of the sets from the second to the sixth cause the working elements to move toward and with the blanks in the same general manner as do the dies of the first set cause the scoring elements to move toward and with the strip.

The action of the scoring knives 64, 65 of the second set of rolls is to impart lines of score 145 to a blank to define the side and end bars of a link.

The action of the severing and crimping element of the dies 32 and 33 of the third set of rolls is to sever the stock along the line of score 144 and along the portions of the lines of score 145 adjacent said line of score 144, to crimp or form the forward or free end of the central portion or long, narrow lip of the large end or sprocket bar of each link, and to crimp or form the central portion or narrow lip of the small end bar or pintle of said link. The severing edges 72 and 77 of the dies of the third set cooperate to sever the metal along the lines of score 145 adjacent the line of score 144, and the severing and crimping punch 68 simultaneously severs the metal along said line of score 144. The combined action of the crimping surfaces 70, 79 and 69, 75 is to throw the severed free end of the central portion or long lip and the narrow lip of the small end bar of the link blank out of the plane of the link side bars, and to give to both said free end and said narrow lip a quarter-circle crimp, as indicated at 146 and 147. It will be apparent from Fig. 9 that the peripheral faces of the dies 32 and 33 themselves are in engagement with the opposite faces of the metal constituting the side bars of the link blank while the severing, crimping and preliminary forming elements of said dies 32 and 33 are operating.

The action of the dies 36 and 37 of the fourth set of rolls is to sever the body of the central portion or long lip of the link blank adjacent its severed and crimped or formed end, to throw the short, wide lip of the large end of sprocket bar and the severed long, narrow lip thereof in opposite directions out of the plane of the link side bars, to simultaneously bend, form, or shape said short, wide lip of the large end or sprocket bar to final form, and to bend, form or shape the short, wide lip of the small end bar or pintle to final form, to complete the forming operations upon said small end bar or pintle.

The combined action of the part-circle surfaces 81 and 90 is to shape the wide lip of the small end bar to its final quarter-circle form, as indicated at 148, while the quarter-circle surfaces 83 and 91 are in engagement with the opposite faces of the narrow lip of said small end bar to insure that said narrow lip will not lose its quarter-circle shape received in the third set of rolls. The part-circle surfaces 81 and 90 throw the wide lip of the small end bar out of the plane of the link side bars, so that a link blank just past the rolls of the fourth set has its wide and its narrow lips situated at one side of its side bars. See Fig. 13. The combined action of the shearing and bending projection 82 and the cutting edges 85 and 97 is to sever the metal along the lines of score 145 and to bend the body of the central portion or long, narrow lip out of the plane of the link blank side bars, as indicated at 149. The combined action of the part-circle surfaces 88 and 95 is to throw the short, wide lip of the sprocket bar out of the plane of the link side bars in direction opposite that to which the long, narrow lip is thrown, and to impart to said short, wide lip its final shape; that is, quarter-circle shape, as indicated at 150. Naturally, the throwing of the severed metal for the long lip of the sprocket bar in one direction away from the plane of the link blank side bars assists the operation of throwing the wide lip in opposite direction, and vice versa. The short, curved shaping surface is, in effect, an axis about which the large end bar or end hook is turned during the operations upon the sprocket bar in the fourth set of rolls. The flanges 96 cooperate with the peripheral surface of the die 36 in feeding the blank vertically forwardly while the severing, bending, and forming operations are being accomplished by the fourth set of rolls, and the depression or space 93 between the flanges 96 allows ready passage of the long lip beyond the die 37. See Fig. 13.

The action of the dies 40 and 41 of the fifth set of rolls is to finally position the small end bar or pintle at right-angles to the link blank side bars, and to throw the short, wide lip of the large end or sprocket bar and the severed long, narrow lip thereof in opposite directions further away from the plane of the link blank side bars, to approximately perpendicular position with respect to said side bars so that the end hook is in its final forming and assembling position.

The combined action of the bending surfaces 99 and 106 is to place the small end bar or pintle perpendicular to the link blank side bars, as indicated at 151. The bending surfaces 99 and 106 engage the opposite faces of the formed short, wide lip of the small end bar or pintle and together bend the forward ends of the link side bars, as indicated at 152, to cause the short, wide lip of the small end bar to move away from the flanges 104 and the short, narrow lip thereof to move further into the space 105 between said flanges, while retaining the quarter-circle shape imparted to said short, wide lip in the fourth set of rolls. The radial shoulders 141 and 142 cooperate with the bending surfaces 99 and 106 to insure desired registration between the wide lip of the small end bar and said bending surfaces 99 and 106, as hereinbefore fully set forth. The combined action of the bending surfaces 102 and 107 and the radial face 101 is to throw the short, wide lip of the sprocket bar further away from the plane of the link blank side bars and thus throw the long, narrow lip further into the space 105, to place the sprocket bar almost horizontal and in its final forming and assembling position, as indicated at 153. The flanges 104 cooperate with the peripheral surface of the die 40 in feeding the link blank vertically forwardly while the severing, bending, and forming operations are being accomplished by the fifth set of rolls, and the space 105 allows ready passage of the long lip of each link blank into and out of the die 41. See Fig. 17.

It will be apparent that the guide devices consisting of the guides or gages 135 are adapted to assist the dies themselves in insuring vertical feeding of the blanks past the several sets of rotatable dies.

The action of the dies 44 and 45 of the last set of rolls is to finally shape the end hook or lip around the small end bar of the succeeding severed link blank. Previous to reaching the final set of rolls, the short, wide lip and the outer end of the narrow lip for the large end bar of the link have been properly crimped to assist the rolling of the sprocket bar to circular form, as indicated at 154, and the part-circle surfaces of each element 108 and 110 of the final set, including the transversely arranged mandrel 112 in one of said part-circle surfaces, defining the detaching slot 155 in the finished chain, nicely cooperate to provide a cylindrical sprocket bar. As already stated, there is at all times a link blank being operated upon in the assembling rolls and engaged by the forward end of a succeeding link blank from the rotatable dies of the fifth set. The blanks enter the assembling rolls small end bar or pintle first. An original link blank (at the start of the chain making operation) would rest upon the die 44 of the assembling set until a part-circle surface 109 rode beneath the small end bar or pintle thereof. Then said original blank would feed ahead, the large end bar or end hook being positioned in the part-circle surfaces 109 and 111 directly following. The small end bar of the next succeeding link blank would position itself upon the upper (inner) face of said large end bar or end hook (see Figs. 4 and 18), and the end hook would be closed about said succeeding small end bar. Similarly, the end hook of each link blank would be closed about the small end bar or pintle of the next succeeding link blank. As shown, the free end or crimped portion of the long, narrow lip first contacts with the part-circle surface 111 and later the short, wide lip positions itself in the part-circle surface 109 in front of the mandrel 112. Finally, the part-circle surfaces turn the end hook to circle form in a manner which is obvious.

All of the forming, severing and assembling elements have forward motion with the metal stock, as well as motion toward and from the stock. It is this forward motion of the elements with the stock that makes possible the transformation of the metal into connected chain links while being fed.

The rotatable dies of all of the six different sets are, of course, driven ahead in proper synchronization to accomplish the chain making result as described. The rolls of the first and sixth sets may have any preferred number of duplicate working elements. The rolls of the second through the fifth sets preferably each have a single working element, although each of these mentioned rolls could have a plurality of sets. Obviously, the machine could have a greater or less number of sets of rolls than illustrated and described, and the operations performed by a set could be different; that is to say, for example, the chain forming operations could be accomplished by use of five or seven sets of rolls, and the individual sets could perform chain transforming operations in a manner and in a sequence different from that disclosed, each operation (or segregated series of operations) in the present machine being performed practically independently of all other operations (or segregated series of operations). Also, the feeding of the severed link blanks from work station to work station could, evidently, be accomplished by special devices (not shown), instead of by gravity.

A shaft 156, carrying a sprocket wheel 157 forming a part of a link sizer or stretching mechanism, is mounted in the uprights 2, 3 beneath the rotatable dies of the assembling set of rolls, as indicated at 158. The shaft 156 has a gear 159 which meshes with a gear 160 on the shaft 47, whereby rotation of said shaft 47 with its rotatable die 45 causes the sprocket wheel 157 to rotate, at the same speed as the rotatable dies of the assembling set, in the direction of the arrow in Fig. 3. The sprocket wheel 157 is fixed upon the shaft 156 in the line of feed of assembled links passing from the last set of rolls.

The remainder of the link sizer or stretching mechanism is best disclosed in Figs. 1 to 4. 161 is a presser plate secured to the machine base 1 as at 162 directly beneath and closely adjacent to the sprocket wheel 157. As illustrated, the upper face 163 of the presser plate describes an arc concentric with the perimeter of the sprocket wheel. The individual teeth 164 of the sprocket wheel 157 are desirably of thickness not much less than the distance between the side bars of a link, and said teeth are each of width at their bases a trifle greater than the distance between sprocket bars when links are assembled, tapering gently to the perimeter of the sprocket wheel where they are of width to easily enter each link when assembled. The margin of the sprocket wheel between teeth is preferably of that curvature best suited to receive large end or sprocket bars.

The manner in which the sizer or stretching mechanism functions is obvious. When a formed and coupled link which has left the sixth (or assembling) set of rolls (the spacing mandrel naturally receding from the detaching slot of the sprocket bar which it defines) shall have been associated with a tooth of the sprocket wheel, advancement of the sprocket wheel, in synchronism with the sets of rolls, will carry the link above the face 163 of the presser plate. The presser plate will, naturally, force the link, with pressure, upon the tapered faces of said tooth. Each assembled link thereafter coming from the sixth set of rolls will likewise pass above the presser plate. Referring to Fig. 4, it will be seen that the pressure of the presser plate is exerted against the large end or sprocket bars of the links, to push said bars up toward or to the margin of the sprocket wheel between its teeth. All of the teeth of said sprocket wheel are duplicates and the teeth are spaced uniform distances apart, and therefore, the pressure exerted to stretch the span between the sprocket bars of adjacent links will be the same in the instance of each of the links. Consequently, when the links shall have passed from the presser plate, the span between the sprocket bars will be the same for all of the assembled links; that is, the links will be stretched up to size. It is found advantageous when manufacturing links of the present nature, (strip metal slightly varying in thickness must necessarily be utilized), to make provision in the structure of the apparatus to insure that all of the links will be of size a trifle less than a predetermined size, and to employ a sizer or stretching mechanism to bring each link up to said predetermined size.

After the assembled links have passed from the presser plate, it is, obviously, necessary that they be stripped from the teeth of the sprocket wheel. The mechanism for so stripping the links may consist of a second sprocket wheel 165 upon a shaft 166 mounted in the uprights 2, 3. The second sprocket wheel 165 is driven in the direction of the arrow in Fig. 2 by means of a gear 167 upon said shaft 166 meshing with a gear 168 upon shaft 46 having rotatable die 44. As disclosed, the sprocket wheel 165 is at the elevation of the assembling dies, above the sprocket wheel 157, in advance thereof, and in the line of feed of the assembled links passing therefrom. Clearly, when a formed and coupled link from the sizing and stretching sprocket wheel 157 shall have been associated with a tooth 169 of the sprocket wheel 165, advancement of said sprocket wheel 165, in synchronism with the sprocket wheel 157, will carry the links away from the axis of the sizing and stretching sprocket wheel and off of the teeth thereof, and thus insure proper stripping action. See Fig. 4. The teeth 169 of the stripping sprocket wheel 165 are of dimension to loosely enter between sprocket bars of adjacent connected links, so that the finished chain will freely leave the machine.

It will be noted that the only feed necessary on the machine is the working elements and dies themselves, although the feeding could be accomplished otherwise. The elements of the first set of rolls cooperate to feed the strip of metal. The elements of the other sets of rolls cooperate to feed the link blanks past the rolls. The link blanks are fed to the second, third, fourth, fifth, and sixth sets by gravity. The connected chain links are fed out of the machine by the sizer sprocket wheel 157 and the stripping sprocket wheel 165.

The advantages of the present method and apparatus over the disclosure of the Locke and Parker application hereinbefore identified are obvious. The present machine is simplified and the difficulty of accurately timing a plurality of sets of rolls is eliminated.

The performance of each operation (or segregated series of operations) practically independently of all other operations (or segregated series of operations) greatly facilitates the accomplishment of synchronization of the working elements with each other and registration of the stock with the working elements, as will be clear.

Many alterations in the construction and many apparently widely differing embodiments and applications of the invention will suggest themselves to those skilled in the art of making sheet metal chain links and chain making machines without departing from the scope and spirit thereof. The disclosure and description herein are purely illustrative, and are not intended to be in any sense limiting.

What I claim is:

1. In a machine for transforming a strip of metal into a chain, means for severing link blanks from the strip, a plurality of sets of dies arranged vertically one below another, means for feeding a blank to the uppermost of said sets, means for discharging the blank from one set of dies to the next lower one, said means permitting the blank to pass by gravity to said lower set, the lowermost set of dies being adapted to assemble the links into a chain.

2. In a machine for transforming a strip of metal into a chain, means for severing link blanks from the strip, a plurality of sets of dies arranged vertically one below another, means for feeding a blank to the uppermost of said sets, means for discharging the blank from one set of dies to the next lower one, said means permitting the blank to pass by gravity to said lower set, the lowermost set of dies being adapted to assemble the links into a chain, each set of dies being adapted to act upon the blank while moving it downwardly.

3. In a machine for transforming a strip of metal into a chain, means for severing link blanks from the strip, a plurality of sets of dies, each set adapted to act upon a blank while moving it forwardly, means for feeding a blank to the first set, and means for feeding the blank from one set to another.

4. In a machine for transforming a strip of metal into a chain, means for severing blanks from the strip, a plurality of pairs of rotary dies disposed vertically one above the other, whereby a blank discharged from between one pair of dies may fall into position to be acted upon by the next lower pair of dies, and means to guide a blank from one pair of dies to the next.

5. In a machine for transforming a strip of metal into a chain, means for severing blanks from the strip, a pair of rotary dies disposed on substantially horizontal axes, with the peripheries substantially in contact, and cooperating die elements on said dies adapted to operate upon opposite sides of a blank, said dies having recesses in the peripheries thereof, said recesses having their forward edges opposite each other to form a substantially continuous surface receiving the edge of the blank.

6. In a machine for transforming a strip of metal into a chain, means for severing blanks from the strip, a pair of rotary dies disposed on substantially horizontal axes, with the peripheries substantially in contact, and cooperating die elements on said dies adapted to operate upon opposite sides of a blank, one of said dies having a recess adapted to receive the lower part of the blank.

7. In a machine for transforming a strip of metal into a chain, means for feeding the strip along a horizontal plane, means for severing link blanks from the strip, means to divert and guide the severed blanks to move in a downward direction, means to operate upon the blanks and drop them, means to catch the dropped blanks and perform a further operation thereon, and means to assemble the links formed from the blanks into a chain.

8. In a machine for transforming a strip of metal into a chain, means for severing link blanks from the strip, means to operate upon a blank and to drop it to a lower position, and means at that lower position to perform a further operation upon the blank.

9. In a machine for transforming a strip of metal into a chain, means for severing blanks from the strip, a pair of rotary dies disposed on substantially horizontal axes and with the peripheries substantially in contact, cooperating die elements on said dies adapted to operate upon opposite sides of a blank, means for feeding a blank to said dies downwardly, and means on at least one of said dies forming a stop to engage the edge of the blank when so fed.

10. In a machine for transforming a strip of metal into a chain, means for severing blanks from the strip, a pair of rotary dies disposed with the peripheries substantially in contact, cooperating die elements on said dies adapted to operate upon opposite sides of a blank, means for feeding a blank to said dies, and means on at least one of said dies forming a stop to engage the edge of the blank when so fed.

Signed at Bridgeport, in the county of Fairfield and State of Connecticut, this 15th day of November, A. D. 1926.

CHARLES PARKER.